US012565353B2

(12) United States Patent
Sollie et al.

(10) Patent No.: US 12,565,353 B2
(45) Date of Patent: Mar. 3, 2026

(54) BOX WITH TOP HANDLE

(71) Applicant: Pratt Corrugated Holdings, Inc., Brookhaven, GA (US)

(72) Inventors: Greg Sollie, Sharpsburg, GA (US); Paul Ott, Atlanta, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 0 days.

(21) Appl. No.: 18/899,200

(22) Filed: Sep. 27, 2024

(65) Prior Publication Data

US 2025/0108955 A1 Apr. 3, 2025

Related U.S. Application Data

(60) Provisional application No. 63/541,424, filed on Sep. 29, 2023.

(51) Int. Cl.

| | |
|---|---|
| ***B65D 5/46*** | (2006.01) |
| ***B31B 50/26*** | (2017.01) |
| ***B65D 5/20*** | (2006.01) |
| ***B65D 5/22*** | (2006.01) |
| *B31B 100/00* | (2017.01) |
| *B31B 110/35* | (2017.01) |

(52) U.S. Cl.
CPC .......... *B65D 5/46192* (2013.01); *B31B 50/26* (2017.08); *B65D 5/2057* (2013.01); *B65D 5/22* (2013.01); *B31B 2100/0024* (2017.08); *B31B 2110/35* (2017.08)

(58) Field of Classification Search
CPC .... B65D 5/46192; B65D 5/2057; B65D 5/22; B65D 5/241; B65D 5/28; B65D 5/6655; B65D 5/46112; B65D 5/244; B65D 5/001; B65D 5/46144; B65D 5/3621; B65D 2571/00512; B65D 5/46032; B65D 5/6608; B65D 5/665; B65D 81/3813
USPC .... 229/117.13, 117.15, 117.14, 117.22, 149, 229/153, 117.24, 117.01, 117.12, 122.32, 229/942, 148, 132
See application file for complete search history.

(56) References Cited

U.S. PATENT DOCUMENTS

| | | | | |
|---|---|---|---|---|
| 7,967,186 B2 * | 6/2011 | Brandinelli ........ | B65D 5/46032 229/117.22 |
| 9,248,933 B2 * | 2/2016 | Spivey, Sr. .......... | B65D 5/4204 |
| 9,981,797 B2 * | 5/2018 | Aksan ................ | B65D 81/3816 |
| 2001/0004088 A1 * | 6/2001 | Lau ...................... | B65D 5/2033 229/117.22 |
| 2006/0266812 A1 * | 11/2006 | Von Bokel ............. | B65D 71/36 229/117.14 |
| 2016/0039559 A1 * | 2/2016 | Williams ............... | B65D 5/029 229/151 |

* cited by examiner

*Primary Examiner* — Christopher R Demeree
(74) *Attorney, Agent, or Firm* — Taylor Duma LLP

(57) ABSTRACT

A box includes a plurality of sidewall panels; a bottom panel arranged at a bottom end of the sidewall panels; and a top panel arranged at a top end of the sidewall panels; wherein each sidewall panel is hingedly coupled to an adjacent sidewall panel by a foldable gusset.

16 Claims, 9 Drawing Sheets

BOX WITH TOP HANDLE

CROSS-REFERENCE TO RELATED APPLICATIONS

This application claims the benefit of U.S. Provisional Patent Application No. 63/541,424, filed on Sep. 29, 2023, the entire contents of which are expressly incorporated herein by reference.

TECHNICAL FIELD

This disclosure relates to packaging. More specifically, the present disclosure relates to a box assembly having a top handle.

BACKGROUND

Assembling a box often requires manual labor and multiple assembly steps, which can be costly and time-consuming. Additionally, typical boxes may often require positioning two hands underneath the box or grasping the box from opposing sides.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a box including a plurality of sidewall panels; a bottom panel arranged at a bottom end of the sidewall panels; a top panel arranged at a top end of the sidewall panels; and a handle cut formed in the top panel and defining a box handle, the box handle foldable relative to the top panel between a pre-erected configuration and an erected configuration; wherein, in the pre-erected configuration, the box handle is coplanar with the top panel, and, in the erected configuration, the box handle extends outwardly and away from the top panel.

Also disclosed is a box assembly including a box blank including a plurality of sidewall panels, and a bottom panel arranged at a bottom end of the sidewall panels; and a support assembly including a top edge defining a center opening, the support assembly being configured to slidably receive the box blank therein, wherein the box blank is foldable from a blank configuration to an assembled box configuration, the top edge of the support assembly is configured to support the plurality of sidewall panels of the box blank thereon so the bottom panel is disposed inwardly of the top edge, and the top edge of the support assembly is configured to fold the plurality of sidewall panels inwardly so that the box blank is folded from the box blank configuration to the assembled box configuration when the box blank is slidably received within the support assembly.

Also disclosed is a method of assembling a box from a box blank, including the steps of obtaining a box blank including a plurality of sidewall panels, and a bottom panel arranged at a bottom end of the sidewall panels; obtaining a support assembly including a top edge defining a center opening, the support assembly being configured to slidably receive the box blank therein; placing the box blank on the support assembly so that each sidewall panel of the plurality of sidewall panels is supported by the top edge of the support assembly; and exerting downward force on the bottom panel of the box blank so that the bottom panel is moved downwardly into the support assembly and the top edge of the support assembly cams each sidewall panel of the plurality of sidewall panels toward a vertical orientation with respect to the bottom panel.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
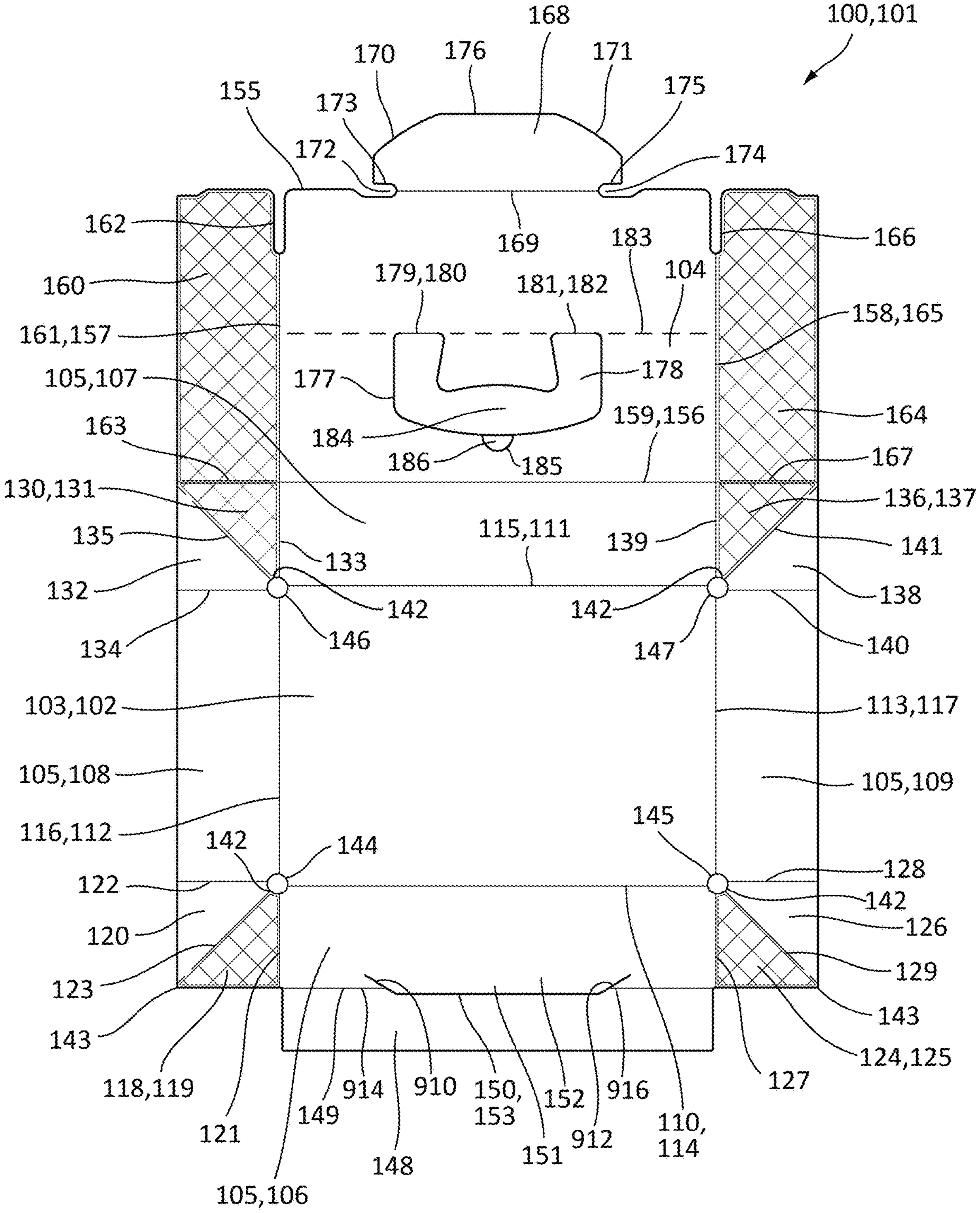
FIG. 1 is a top view of a box in a blank configuration, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a box and associated methods, systems, devices, and various apparatus. Example aspects of the box can be folded from a blank configuration to an assembled configuration and can comprise a top handle. It would be understood by one of skill in the art that the box is described in but a few exemplary embodiments among many. No particular terminology or description should be considered limiting on the disclosure or the scope of any claims issuing therefrom.

Figure 2:
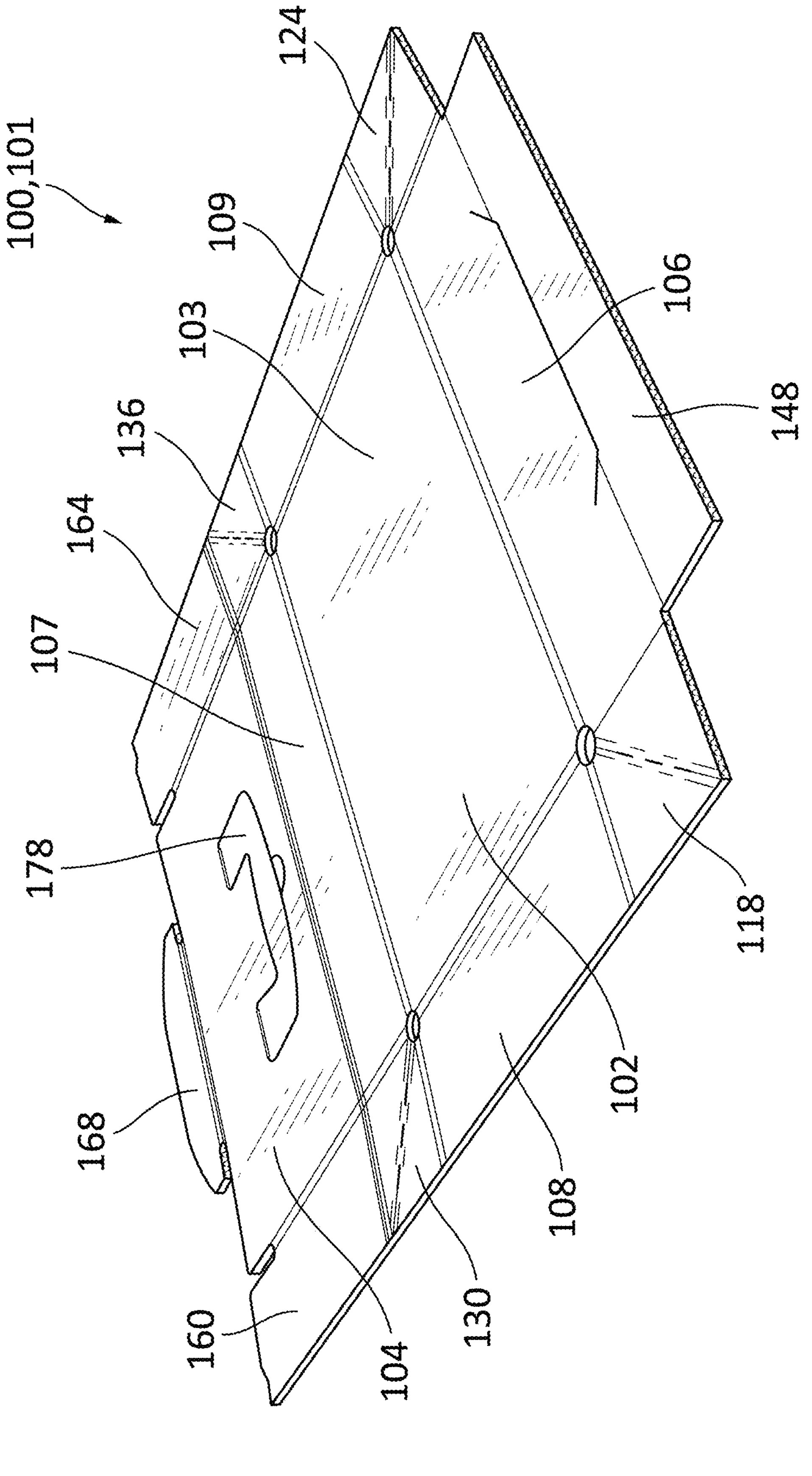
FIG. 2 is a perspective view of the box in the blank configuration of FIG. 1.

FIGS. 1 and 2 are top and perspective views, respectively, of a box 100 in a blank configuration, in accordance with one aspect of the present disclosure. The box 100 can define a box blank 101 in the blank configuration. The box blank 101 can be folded as described in further detail below to assemble the box 100 in an assembled configuration (completed assembled configuration shown with reference to FIG. 10). The box blank 101 can be formed as a single, unitary box blank 101, which can be substantially planar in the blank configuration, as shown. Example aspects of the box blank 101 can comprise corrugated cardboard. In other aspects, the box blank 101 can comprise a different material, such as paperboard, corrugated plastic, or any other suitable material. The box blank 101 can define an inner surface 102 and an outer surface 302 (shown in FIG. 3) opposite the inner surface 102.

According to example aspects, the box blank 101 of the box 100 can comprise a bottom panel 103 and a top panel 104. The box blank 101 can further comprise a plurality of sidewall panels 105, which can include a front panel 106, a rear panel 107, a first side panel 108, and a second side panel 109. The bottom panel 103 can define a bottom front edge 110, a bottom rear edge 111, a bottom first side edge 112, and a bottom second side edge 113. The front panel 106 can be hingedly coupled to the bottom panel 103 by a front fold line 114 at the bottom front edge 110. The rear panel 107 can be hingedly coupled to the bottom panel 103 by a rear fold line 115 at the bottom rear edge 111. The first side panel 108 can be hingedly coupled to the bottom panel 103 by a first side fold line 116 at the bottom first side edge 112. The second side panel 109 can be hingedly coupled to the bottom panel 103 by a second side fold line 117 at the bottom second side edge 113. The various fold lines and bend lines identified within the specification can be formed by techniques such as scoring, perforation, pre-creasing, cutting, or any other suitable method. In some aspects, the various fold lines identified herein can be double fold lines comprising a pair of parallel fold lines.

A first front gusset 118 can be arranged between the front panel 106 and the first side panel 108. The first front gusset 118 can comprise a first front gusset flap 119 and a first front-side gusset flap 120. The first front gusset flap 119 can be hingedly coupled to the front panel 106 by a first front gusset fold line 121, and the first front-side gusset flap 120 can be hingedly coupled to the first side panel 108 by a first front-side gusset fold line 122. The first front gusset flap 119 can be hingedly coupled to the first front-side gusset flap 120 by a first front gusset bend line 123. In example aspects, the first front gusset bend line 123 can be perforated to allow for a greater range of motion between the first front gusset flap 119 and the first front side gusset flap 120.

A second front gusset 124 can be arranged between the front panel 106 and the second side panel 109. The second front gusset 124 can comprise a second front gusset flap 125 and a second front-side gusset flap 126. The second front gusset flap 125 can be hingedly coupled to the front panel 106 by a second front gusset fold line 127, and the second front-side gusset flap 126 can be hingedly coupled to the second side panel 109 by a second front-side gusset fold line 128. The second front gusset flap 125 can be hingedly coupled to the second front-side gusset flap 126 by a second front gusset bend line 129. In example aspects, the second front gusset bend line 129 can be perforated to allow for a greater range of motion between the second front gusset flap 125 and the second front side gusset flap 126.

A first rear gusset 130 can be arranged between the rear panel 107 and the first side panel 108. The first rear gusset 130 can comprise a first rear gusset flap 131 and a first rear-side gusset flap 132. The first rear gusset flap 131 can be hingedly coupled to the rear panel 107 by a first rear gusset fold line 133, and the first rear-side gusset flap 132 can be hingedly coupled to the first side panel 108 by a first rear-side gusset fold line 134. The first rear gusset flap 131 can be hingedly coupled to the first rear-side gusset flap 132 by a first rear gusset bend line 135. In example aspects, the first rear gusset bend line 135 can be perforated to allow for a greater range of motion between the first rear gusset flap 131 and the first rear side gusset flap 132.

A second rear gusset 136 can be arranged between the rear panel 107 and the second side panel 109. The second rear gusset 136 can comprise a second rear gusset flap 137 and a second rear-side gusset flap 138. The second rear gusset flap 137 can be hingedly coupled to the rear panel 107 by a second rear gusset fold line 139, and the second rear-side gusset flap 138 can be hingedly coupled to the second side panel 109 by a second rear-side gusset fold line 140. The second rear gusset flap 137 can be hingedly coupled to the second rear-side gusset flap 138 by a second rear gusset bend line 141. In example aspects, the second rear gusset bend line 141 can be perforated to allow for a greater range of motion between the second rear gusset flap 137 and the second rear side gusset flap 138.

According to example aspects, each of the first front gusset bend line 123, second front gusset bend line 129, first rear gusset bend line 135, and second rear gusset bend line 141 can extend from an inner corner 142 of the corresponding first front gusset 118, second front gusset 124, first rear gusset 130, and second rear gusset 136, respectively, to an outer corner 143 thereof.

In example aspects, a first front relief hole 144 can be formed at the junction between the bottom panel 103, the front panel 106, the first side panel 108, and the first front gusset 118, generally at the inner corner 142 of the first front gusset 118. A second front relief hole 145 can be formed at the junction between the bottom panel 103, the front panel 106, the second side panel 109, and the second front gusset 124, generally at the inner corner 142 of the second front gusset 124. A first rear relief hole 146 can be formed at the junction between the bottom panel 103, the rear panel 107, the first side panel 108, and the first rear gusset 130, generally at the inner corner 142 of the first rear gusset 130. A second rear relief hole 147 can be formed at the junction between the bottom panel 103, the rear panel 107, the second side panel 109, and the second rear gusset 136, generally at the inner corner 142 of the second rear gusset 136. The first front relief hole 144, second front relief hole 145, first rear relief hole 146, and a second rear relief hole 147 can facilitate folding the box blank 101 to the assembled configuration of FIG. 10 to form the box 100.

Figure 8:
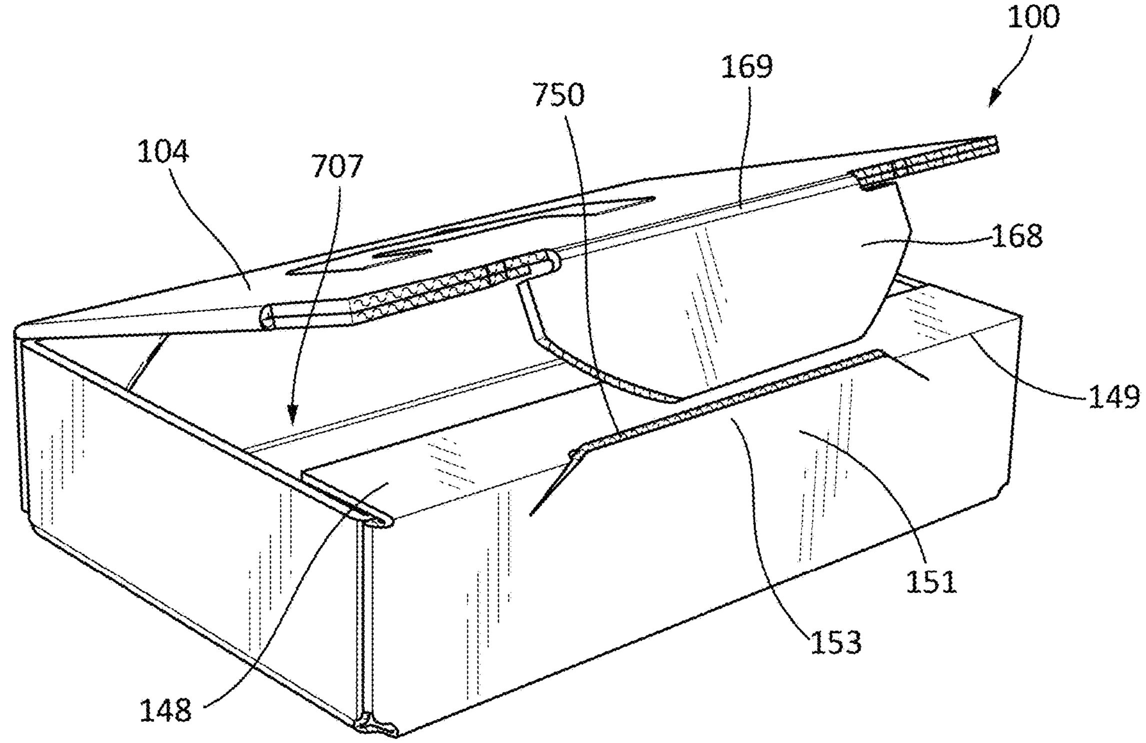
FIG. 8 illustrates a sixth step in assembling the box from the blank configuration of FIG. 1 to the assembled configuration.

The box blank 101 can further comprise a front auxiliary flap 148 hingedly coupled to the front panel 106 by an auxiliary fold line 149 opposite the front fold line 114. A slot cut 150 can be formed in either or both of the front panel 106 and the front auxiliary flap 148 at or adjacent to the auxiliary fold line 149. In the present aspect, the slot cut 150 can be formed in both of the front panel 106 and the front auxiliary flap 148 to define a slot tab 151 extending across the auxiliary fold line 149. A connected slot tab end 152 of the slot tab 151 can be arranged at and connected to the front panel 106. A free slot tab end 153 of the slot tab 151 opposite the connected slot tab end 152 can be arranged at and disconnected from the front auxiliary flap 148. In the assembled configuration of the box 100, the front auxiliary flap 148 can fold relative to the front panel 106 and the slot tab 151 to define a locking slot 750 (shown in FIG. 8). As shown in FIG. 8, the free slot tab end 153 of the slot tab 151 can extend above a top edge of the front panel 106, defined along the auxiliary fold line 149, when the box 100 is in the assembled configuration.

Example aspects of the box blank 101 can further comprise the top panel 104, a first top reinforcing panel 160, a second top reinforcing panel 164, and a locking tab 168. The top panel 104 can define a top front edge 155, a top rear edge 156, a top first side edge 157, and a top second side edge 158. The top panel 104 can be hingedly connected to the rear panel 107, opposite the bottom panel 103, by a top fold line 159 at the top rear edge 156. The locking tab 168 can be hingedly coupled to the top panel 104, opposite the rear panel 107, by a tab fold line 169 at the top front edge 155.

The first top reinforcing panel 160 can be hingedly coupled to the top panel 104 by a first top reinforcing fold line 161 at the top first side edge 157. In some aspects, a first front notch 162 can be formed between the top panel 104 and the first top reinforcing panel 160 proximate the top front edge 155. The first front notch 162 can be aligned with the first top reinforcing fold line 161. The first top reinforcing panel 160 can also be hingedly coupled to the first rear gusset flap 131 of the first rear gusset 130 by a first rear reinforcing fold line 163.

The second top reinforcing panel 164 can be hingedly coupled to the top panel 104 by a second top reinforcing fold line 165 at the top second side edge 158. In some aspects, a second front notch 166 can be formed between the top panel 104 and the second top reinforcing panel 164 proximate the top front edge 155. The second front notch 166 can be aligned with the second reinforcing fold line 165. The second top reinforcing panel 164 can also be hingedly coupled to the second rear gusset flap 137 of the second rear gusset 136 by a second rear reinforcing fold line 167.

The locking tab 168 can define a first tab side 170 and a second tab side 171 opposite the first tab side 170. In example aspects, a first tab notch 172 can be formed between the top panel 104 and the locking tab 168 at the first tab side 170. The first tab notch 172 can be aligned with the tab fold line 169. The first tab notch 172 can define a first locking shoulder 173 of the locking tab 168. Similarly, a second tab notch 174 can be formed between the top panel 104 and the locking tab 168 at the second tab side 171. The second tab notch 174 can be aligned with the tab fold line 169 and the first tab notch 172. The second tab notch 174 can define a second locking shoulder 175 of the locking tab 168. According to example aspects, the first tab notch 172 and the second tab notch 174 can facilitate folding the locking tab 168 relative to the top panel 104. The locking tab 168 can further define a free locking tab end 176 opposite the top panel 104. In some aspects, a width of the locking tab 168 can have a tapering width (i.e., a decrease in width) towards the free locking tab end 176.

In example aspects, a handle cut 177 can be formed in the top panel 104, as shown. The handle cut 177 can define a box handle 178 of the box blank 101. The box handle 178 can define a first connected handle end 179 connected to the top panel 104 at a first handle fold line 180 and a second connected handle end 181 connected to the top panel 104 at a second handle fold line 182. In the blank configuration of the box 100, the box handle 178 can be configured in a pre-erected configuration, wherein the box handle 178 can be coplanar with the top panel 104. In the assembled configuration of the box 100 (shown in FIG. 10), the box handle 178 can be folded relative to the top panel 104 at the first and second handle fold lines 180,182 to an erected configuration, wherein the box handle 178 can extend outwardly and away from the top panel 104. In some aspects, the box handle 178 can be substantially U-shaped, as shown. In some aspects, the first handle fold line 180 and the second handle fold line 182 can be arranged along a lateral centerline 183 (indicated by a dashed line) of the top panel 104. In other aspects, the box handle 178 can define any other suitable shape and/or can be positioned elsewhere on the top panel 104.

Additionally, in some aspects, a finger cut 185 can be formed in the top panel 104 adjacent to the box handle 178. More specifically, the finger cut 185 can be formed adjacent to the box handle 178 at or proximate to a center 184 of the box handle 178, wherein the center 184 of the box handle 178 can be defined centrally between the first connected handle end 179 and the second connected handle end 181. The finger cut 185 can define a finger punch-out 186 that can be punched out of the top panel 104 to form a finger opening 585 (best seen in FIGS. 5 and 6). A user can engage the finger opening 585 with a finger and can hook their finger underneath the box handle 178 to facilitate folding the box handle 178 outwardly from the top panel 104.

In some aspects, an adhesive, such as glue or tape for example and without limitation, can be applied to portions of the inner surface 102 of the box blank 101. For example, in the present aspect, an adhesive can be applied to the inner surface 102 of the box blank 101 at the first front gusset flap 119 of the first front gusset 118, the second front gusset flap 125 of the second front gusset 124, the first rear gusset flap 131 of the first rear gusset 130, the second rear gusset flap 137 of the second rear gusset 136, the first top reinforcing panel 160, and the second top reinforcing panel 164. The portions of the inner surface 102 comprising the adhesive can be adhered to other portions of the box blank 101 in the assembled configuration of the box 100, as described in the further detail below.

Figure 3:
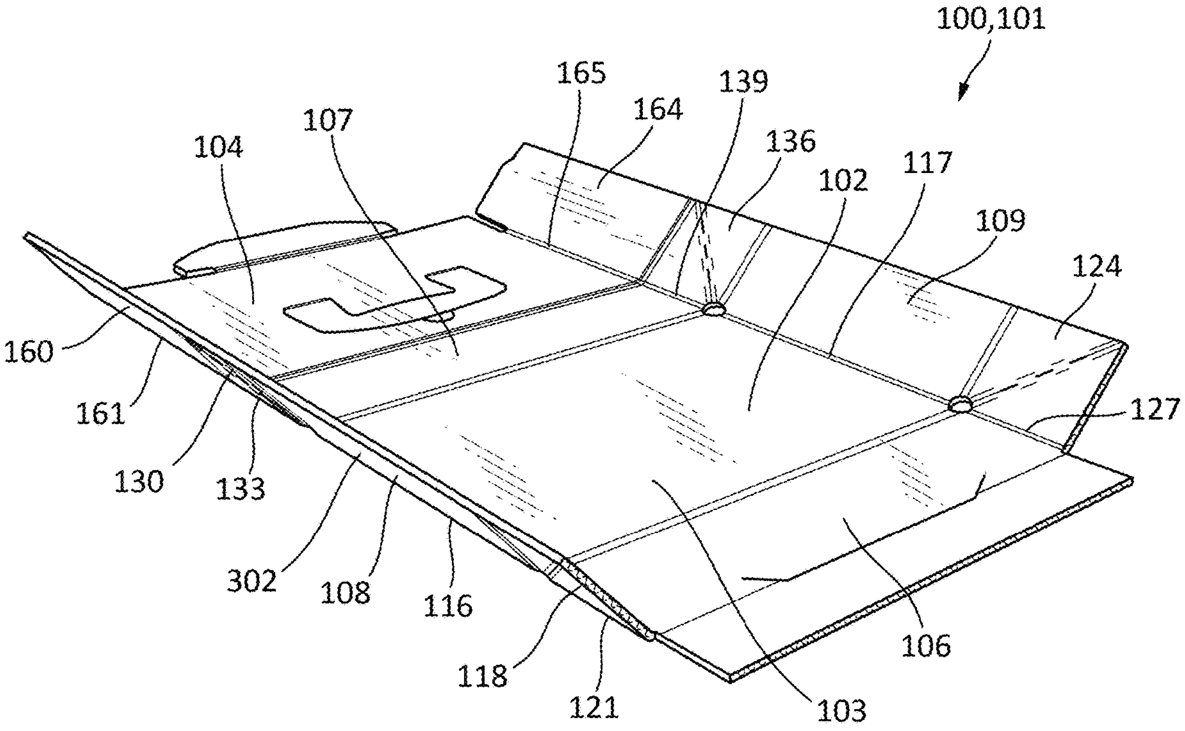
FIG. 3 illustrates a first step in assembling the box from the blank configuration of FIG. 1 to an assembled configuration.
Figure 4:
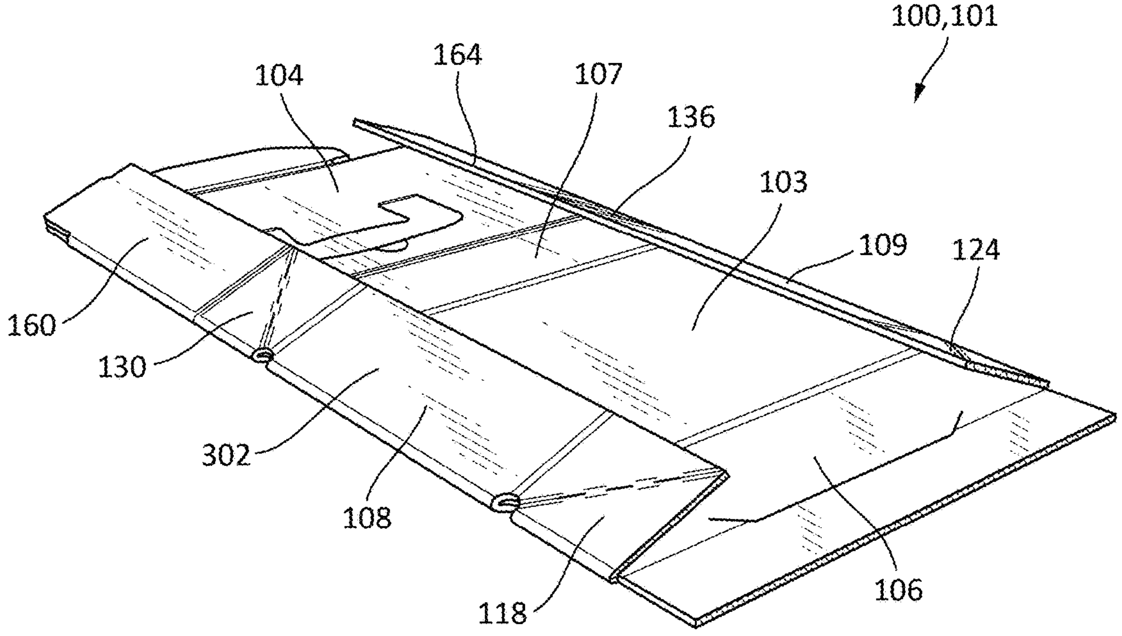
FIG. 4 illustrates a second step in assembling the box from the blank configuration of FIG. 1 to the assembled configuration.
Figure 10:
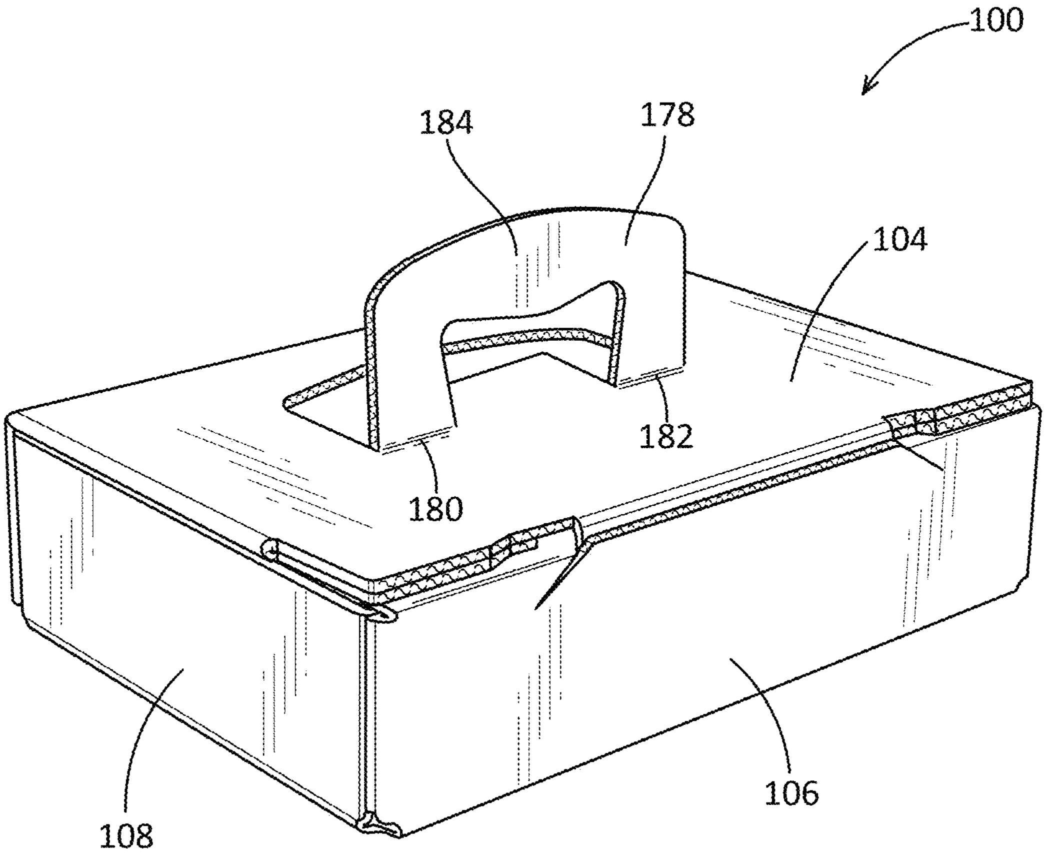
FIG. 10 illustrates the box of FIG. 1 in the assembled configuration

FIGS. 3 and 4 illustrate a first step and a second step in folding the box blank 101 from the blank configuration of FIG. 1 to the assembled configuration of FIG. 10 to form the box 100. Referring to FIG. 3, the first front gusset 118, the first side panel 108, the first rear gusset 130, and the first top reinforcing panel 160 can be folded upwardly and inwardly at the first front gusset fold line 121, the first side fold line 116, the first rear gusset fold line 133, and the first top reinforcing fold line 161, respectively, towards the inner surface 102 of the box blank 101. Similarly, the second front gusset 124, the second side panel 109, the second rear gusset 136, and the second top reinforcing panel 164 can be folded upwardly and inwardly at the second front gusset fold line 127, the second side fold line 117, the second rear gusset fold line 139, and the second top reinforcing fold line 165, respectively, towards the inner surface 102 of the box blank 101.

Referring to FIG. 4, the first front gusset 118 and the second front gusset 124 can be folded to face the front panel 106 substantially. The first side panel 108 and the second side panel 109 can be folded to face the bottom panel 103 substantially. The first rear gusset 130 and the second rear gusset 136 can be folded to face the rear panel 107 substantially. The first top reinforcing panel 160 and the second top reinforcing panel 164 can be folded to face the top panel 104 substantially.

Figure 5:
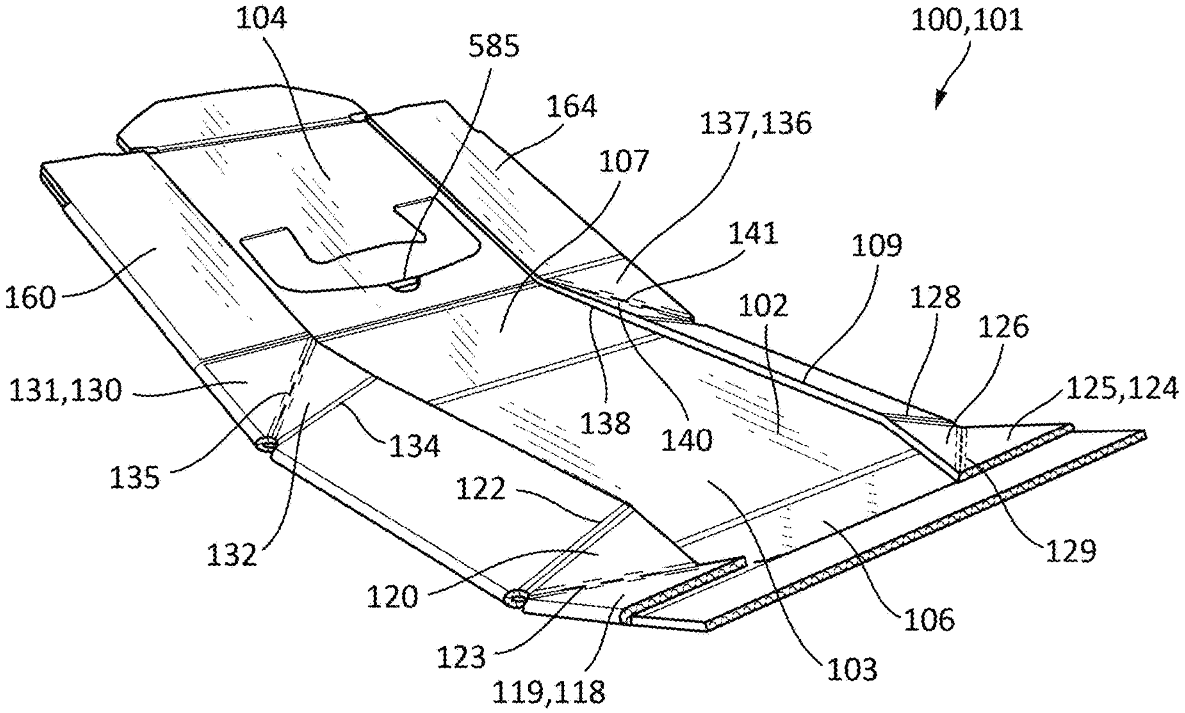
FIG. 5 illustrates a third step in assembling the box from the blank configuration of FIG. 1 to the assembled configuration.

Referring now to FIG. 5, the adhesive applied to the first front gusset flap 119 of the first front gusset 118 and the second front gusset flap 125 of the second front gusset 124 can adhere the first front gusset flap 119 and the second front gusset flap 125 to the front panel 106. The adhesive applied to the first rear gusset flap 131 of the first rear gusset 130 and the second rear gusset flap 137 of the second rear gusset 136 can adhere the first rear gusset flap 131 and the second rear gusset flap 137 to the rear panel 107. The adhesive applied to the first top reinforcing panel 160 and the second top reinforcing panel 164 can adhere the first top reinforcing panel 160 and the second top reinforcing panel 164 to the top panel 104. The first top reinforcing panel 160 and the second top reinforcing panel 164 can provide the benefit of reinforcing the top panel 104.

Furthermore, the first front gusset bend line 123 can allow the first front-side gusset flap 120 to fold relative to the first front gusset flap 119, and the first rear gusset bend line 135 can allow the first rear-side gusset flap 132 to fold relative to the first rear gusset flap 131. The first side panel 108, along with the first front-side gusset flap 120 and the first rear-side gusset flap 132, can be folded outward and away from the bottom panel 103, as shown. Similarly, the second front gusset bend line 129 can allow the second front-side gusset flap 126 to fold relative to the second front gusset flap 125, and the second rear gusset bend line 141 can allow the second rear-side gusset flap 138 to fold relative to the second rear gusset flap 137. The second side panel 109, along with the second front-side gusset flap 126 and the second rear-side gusset flap 138, can be fold outward and away from the bottom panel 103, as shown.

Folding the first side panel 108 outward and away from the bottom panel 103 can simultaneously cause the first front-side gusset flap 120 and the first rear-side gusset flap 132 to fold inwardly relative to the first side panel 108 at the corresponding first front-side gusset fold line 122 and first rear-side gusset fold line 134. Similarly, folding the second side panel 109 outward and away from the bottom panel 103 can simultaneously cause the second front-side gusset flap 126 and the second rear-side gusset flap 138 to fold inwardly relative to the second side panel 109 at the corresponding second front-side gusset fold line 128 and second rear-side gusset fold line 140.

Additionally, the adherence of the first front gusset flap 119 and the second front gusset flap 125 to the front panel 106 can simultaneously cause the front panel 106 to fold inwardly towards the inner surface 102 as the first side panel 108 and the second side panel 109 are folded outwardly and away from the bottom panel 103. The adherence of the first rear gusset flap 131 and the second rear gusset flap 137 to the rear panel 107 can also cause the rear panel 107 simultaneously to fold inwardly towards the inner surface 102 as the first side panel 108 and the second side panel 109 are folded outwardly and away from the bottom panel 103.

Figure 6:
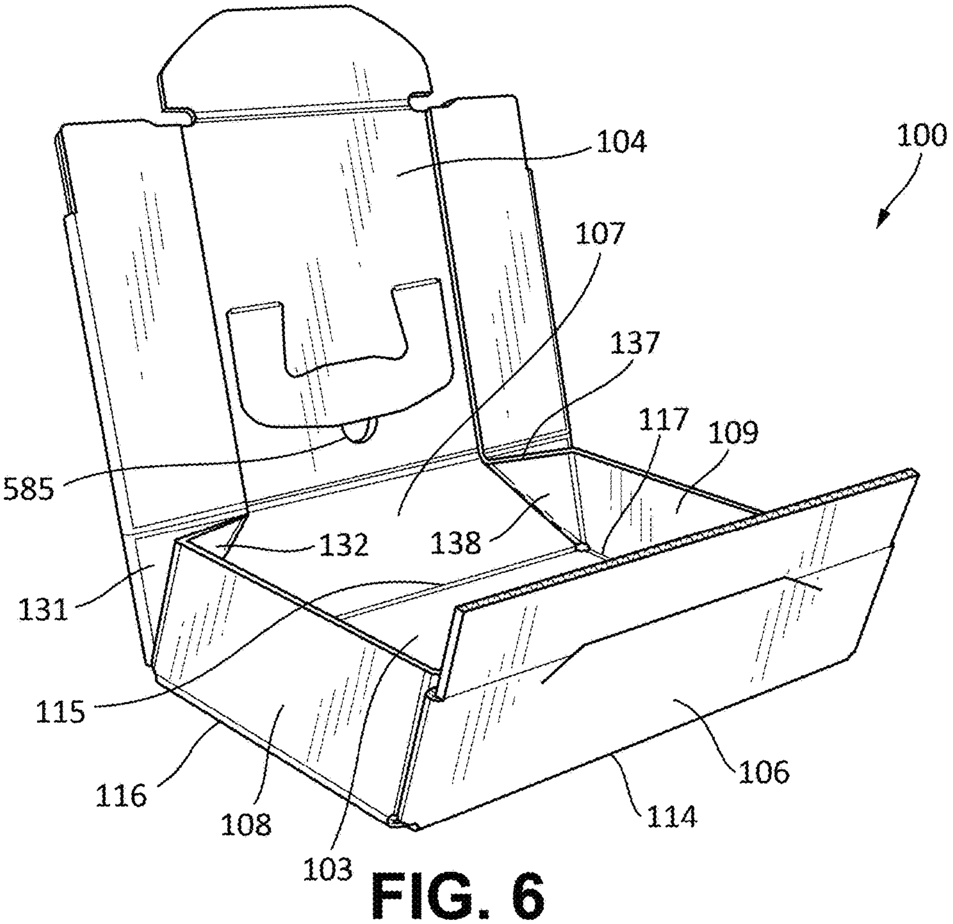
FIG. 6 illustrates a fourth step in assembling the box from the blank configuration of FIG. 1 to the assembled configuration.

As shown in FIG. 6, the first side panel 108 and the second side panel 109 can be folded at the first side fold line 116 and the second side fold line 117, respectively, to be oriented in an upright orientation about perpendicular to the bottom panel 103. In this orientation, the first front-side gusset flap 120 (shown in FIG. 1) and the first rear-side gusset flap 132 can be oriented about perpendicular both to the first side panel 108 and the bottom panel 103. Additionally, in this orientation, the second front-side gusset flap 126 (shown in FIG. 1) and the second rear-side gusset flap 138 can be oriented about perpendicular to both the second side panel 109 and the bottom panel 103.

Folding the first side panel 108 and the second side panel 109 to the upright orientation can simultaneously fold the front panel 106 inwardly at the front fold line 114 to an upright orientation about perpendicular to the bottom panel 103. The first front gusset flap 119 (shown in FIG. 1) and the second front gusset flap 125 (shown in FIG. 1), both adhered to the front panel 106, can confront the first front-side gusset flap 120 and the second front-side gusset flap 126, respectively.

Folding the first side panel 108 and the second side panel 109 to the upright orientation can also simultaneously fold the rear panel 107 inwardly at the rear fold line 115 to an upright orientation about perpendicular to the bottom panel 103. The first rear gusset flap 131 and the second rear gusset flap 137, both adhered to the rear panel 107, can confront the first rear-side gusset flap 132 and the second rear-side gusset flap 138, respectively.

Figure 7:
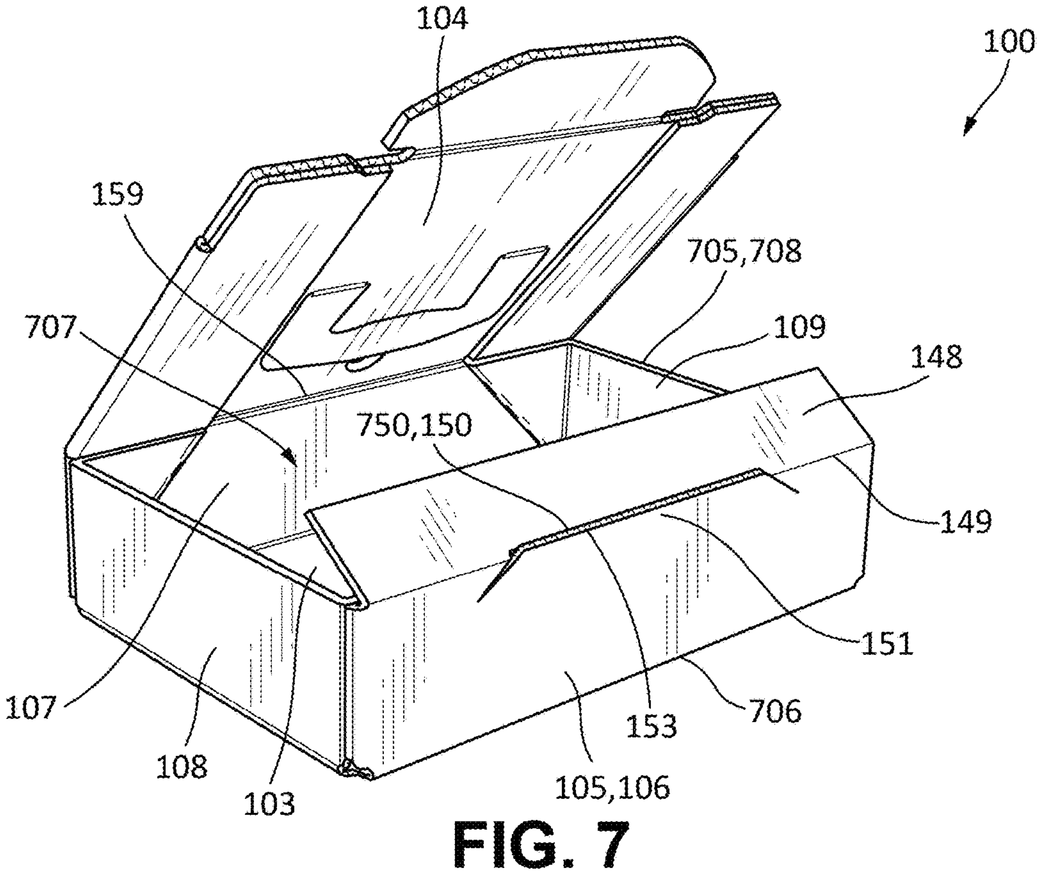
FIG. 7 illustrates a fifth step in assembling the box from the blank configuration of FIG. 1 to the assembled configuration.

As shown in FIG. 7, the sidewall panels 105 (including the front panel 106, the rear panel 107, the first side panel 108, and the second side panel 109) can define a top end 705 and a bottom end 706. The bottom panel 103 can be arranged at the bottom end 706 of the sidewall panels 105. Furthermore, in the present configuration, the bottom panel 103 and the sidewall panels 105 can together define an interior cavity 707 of the box 100. The interior cavity 707 of the box 100 can be configured to receive contents therein, including food items and/or temperature-regulating inserts, for example and without limitations. The interior cavity 707 can define a cavity opening 708 at the top end 705 of the sidewall panels 105 through which contents can be inserted into or removed from the interior cavity 707. The box 100 is shown in an assembled, open, and unlocked configuration in FIG. 7.

The front auxiliary flap 148 can be folded relative to the front panel 106 and the slot tab 151 at the auxiliary fold line 149 towards the interior cavity 707 of the box 100. The front auxiliary flap 148 can be arranged about perpendicular to the front panel 106. Folding the front panel 106 relative to the slot tab 151 can define the locking slot 750 generally at the slot cut 150. The locking slot 750 can be formed at or adjacent to the auxiliary fold line 149. Additionally, the top panel 104 can be folded relative to the rear panel 107 at the top fold line 159 towards the front auxiliary flap 148. In various aspects, the top panel 104 can be separated from the front auxiliary flap 148.

Referring to FIG. 8, with the top panel 104 folded towards, but not all the way to, the front auxiliary flap 148, the box 100 can be arranged in a partially closed configuration. The locking tab 168 can be folded relative to the top panel 104 at the tab fold line 169. The locking tab 168 can be folded inwardly toward the interior cavity 707 of the box 100 to align the locking tab 168 with the locking slot 750.

Figure 9:
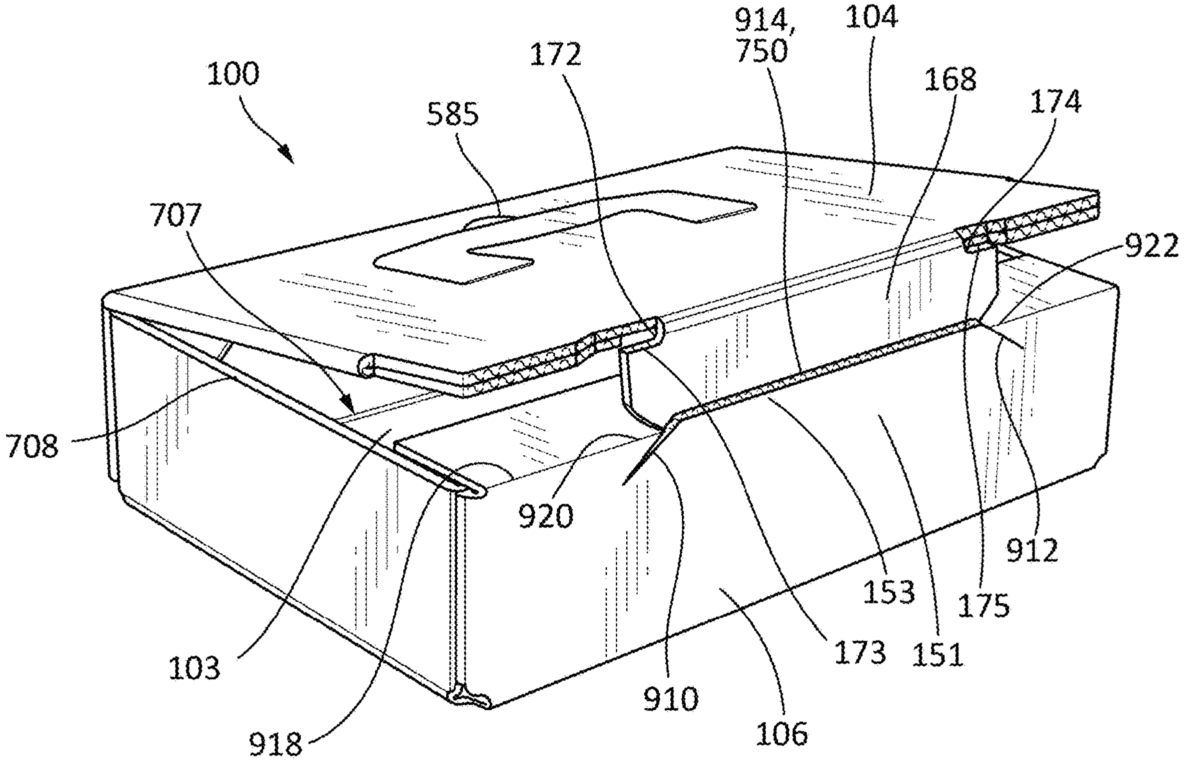
FIG. 9 illustrates a seventh and final step in assembling the box from the blank configuration of FIG. 1 to the assembled configuration.

As shown in FIG. 9, the top panel 104 can then be folded further towards the interior cavity 707 to insert the locking tab 168 through the locking slot 750 and to cover the cavity opening 708 with the top panel 104 in a locked configuration of the box 100. As shown, the free slot tab end 153 of the slot tab 151 can extend vertically beyond the top edge 918 of the front panel 106 and can therefore act as a guide when inserting the locking tab 168 into the locking slot 750. In some aspects, the tapering width of the locking tab 168 can facilitate guiding the locking tab 168 as the locking tab 168 is slidably received in the locking slot 750. In this configuration, the top panel 104 can be arranged about parallel to the opposing bottom panel 103. The locking slot 750 can define a first slot end 910 and a second slot end 912 opposite the first slot end 910. The first slot end 910 and the second slot end 912 can be angled with respect to a center slot portion 914 that can be parallel to a top edge 918 of the front panel 106. In example aspects, the first slot end 910 of the locking slot 750 can catch within the first tab notch 172 and the second slot end 912 of the locking slot 750 can catch within the second tab notch 174 to retain the box 100 in a closed and locked configuration. Put another way, the first and second locking shoulders 173,175 can catch on first and second portions 920 and 922, respectively, of the front panel 106 so that the first and second locking shoulders 173,175 are disposed adjacent the auxiliary fold line 149 when the box 100 is in the closed and locked configuration.

FIG. 10 illustrates the box 100 in the assembled, closed, and locked configuration. To orient the box handle 178 in the erect configuration, a user can engage a finger with the finger opening 585 (shown in FIG. 9). By hooking a finger underneath the box handle 178, the user can lift the box handle 178 at the center 184 thereof and fold box handle 178 outwardly from the top panel 104 at the first handle fold line 180 and the second handle fold line 182. In example aspects, the box handle 178 can be oriented about perpendicular to the top panel 104 in the erect configuration, as shown. The box 100 can thereby be arranged in the fully assembled configuration.

Figure 11:
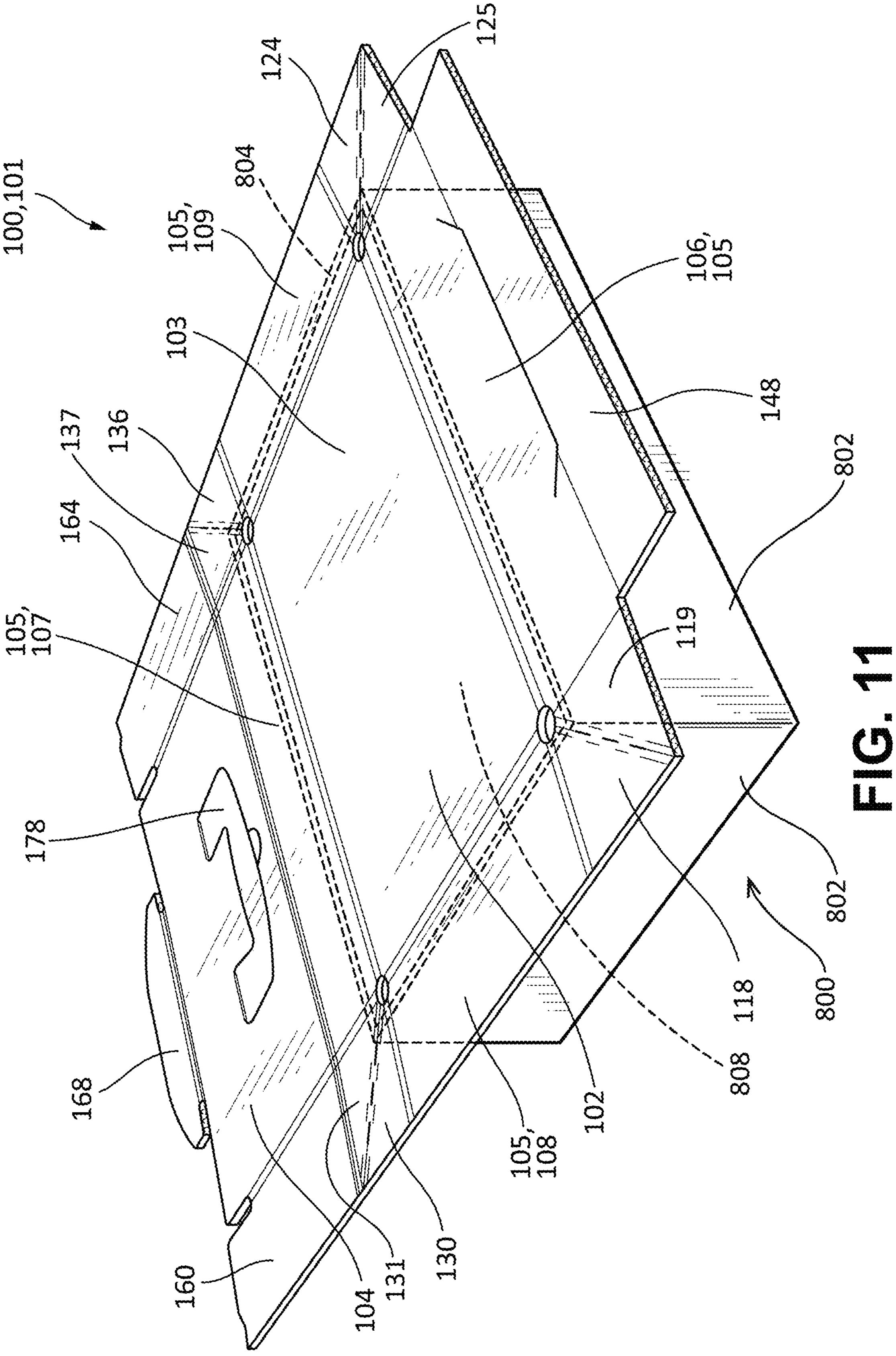
FIG. 11 is a perspective view of the box in the blank configuration of FIG. 1 disposed on top of a support assembly.
Figure 12:
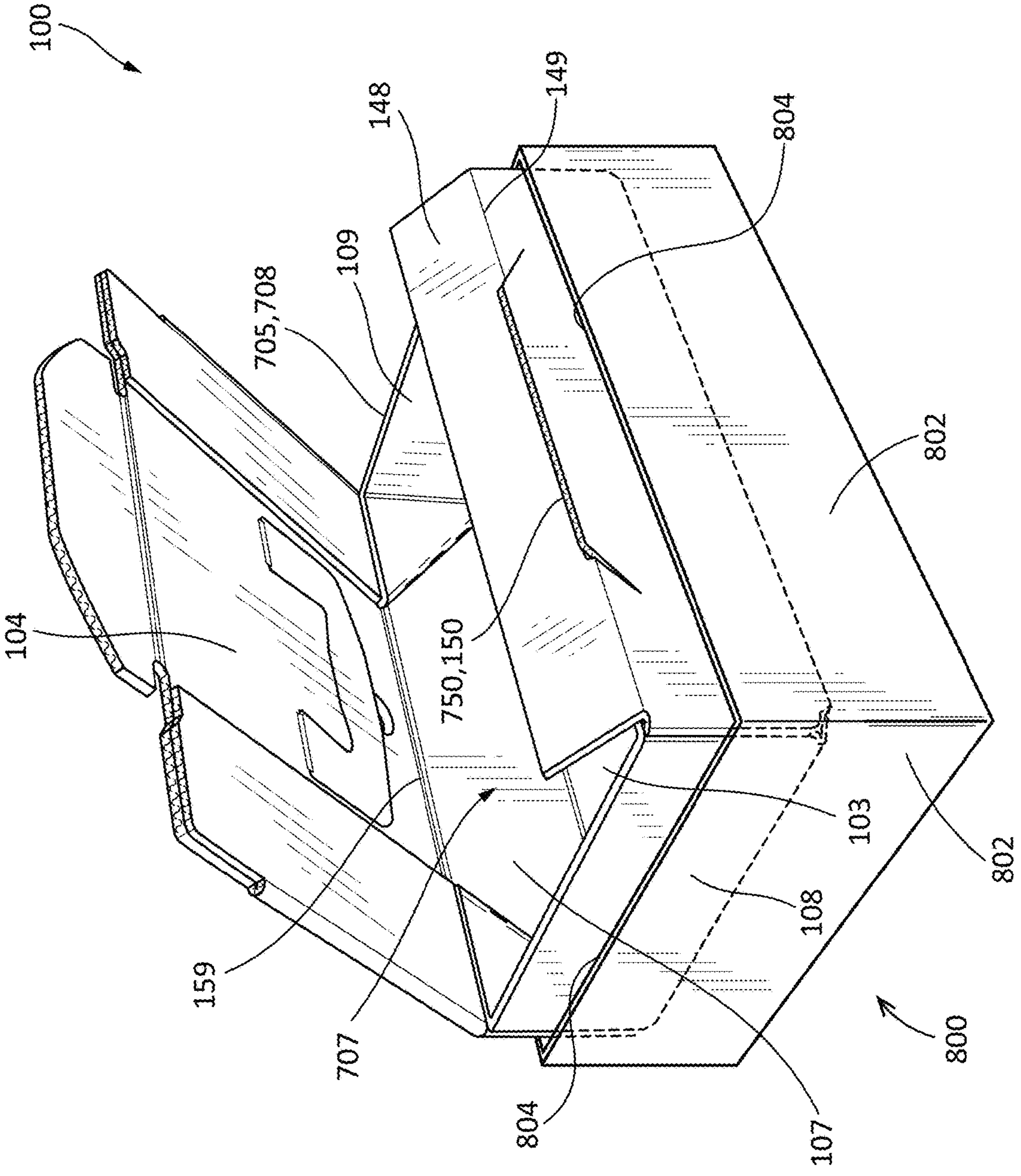
FIG. 12 is a perspective view of a step in assembling the box from the blank configuration of FIG. 1 to the assembled configuration of FIG. 10, utilizing the support assembly of FIG. 11.

As shown in FIG. 11, in various aspects, the box 100 can be an inner box 100 configured to be received within an outer box 800 or other outer packing. According to example aspects, the inner box 100 can be assembled from the blank configuration of FIG. 1 by placing the box blank 101 on top of an open outer box 800. In some aspects, the outer box 800 can include a plurality of sidewall panels 802 defining a top edge 804. The top edge 804 of the outer box 800 can define an opening 806 through which an interior 808 of the outer box 800 can be accessed. The bottom panel 103 of the box blank 101 of the inner box 100 can be positioned directly over the open outer box 800. The bottom panel 103 can be pushed downward into the interior 808 of the open outer box 800, for example, by a user. As the bottom panel 103 of the box blank 101 is slidably received within the outer box 800, the sidewall panels 802 of the outer box 800 can engage and mechanically push the sidewall panels 105 of the inner box 100 (i.e., front panel 106, the rear panel 107, the first side panel 108, and the second side panel 109) into the upright orientation, as shown in FIG. 12, which can be about perpendicular to the bottom panel 103. As previously described, an adhesive can be applied to the first front gusset flap 119 of the first front gusset 118, the second front gusset flap 125 of the second front gusset 124, the first rear gusset flap 131 of the first rear gusset 130, the second rear gusset flap 137 of the second rear gusset 136, the first top reinforcing panel 160, and the second top reinforcing panel 164. As the sidewall panels 105 can be biased to the upright orientation, the portions to which adhesive can be applied can engage and adhere to the corresponding portions of the inner surface 102 to retain the inner box 100 in the assembled configuration.

In example aspects, various steps in the method of assembly of the inner box 100, including applying the adhesive to the relevant portions of the box blank 101 and pushing the bottom panel 103 of the inner box 100 into the outer box 800, can be machine-operated. In some aspects, closing and/or locking the inner box 100 in the closed and/or locked configurations and/or folding the box handle 178 to the erect configuration can also be machine-operated.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A box comprising:

a plurality of sidewall panels;

a bottom panel arranged at a bottom end of the sidewall panels;

a top panel arranged at a top end of the sidewall panels; and a handle cut formed in the top panel and defining a box handle, the box handle foldable relative to the top panel between a pre-erected configuration and an erected configuration;

wherein:

the plurality of sidewall panels comprises a front panel, a rear panel opposite the front panel, a first side panel extending between the front and rear panels, and a second side panel opposite to the first side panel and extending between the front and rear panels;

the top panel comprises a locking tab hingedly coupled to a front edge of the top panel;

the front panel comprises a lock slot defined therein, the lock slot being configured to slidably receive the locking tab therein in a closed configuration; and in the pre-erected configuration, the box handle is coplanar with the top panel, and, in the erected configuration, the box handle extends outwardly and away from the top panel.

2. The box of claim 1, wherein the box handle comprises a first handle end, a second handle end, and a center portion extending therebetween, wherein the first handle end is connected to the top panel at a first fold line, and wherein the second handle end is connected to the top panel at a second fold line.

3. The box of claim 2, wherein the first fold line and the second fold line are arranged along a lateral centerline of the top panel.

4. The box of claim 1, further comprising a finger cut formed in the top panel adjacent to the center portion of the top handle.

5. The box of claim 4, wherein removal of the finger cut defines a finger opening in the top panel adjacent to the center portion of the top handle.

6. The box of claim 1, wherein:

a first tab notch is defined between a first locking shoulder of the locking tab and the front edge of the top panel; and a second tab notch is defined between a second locking shoulder of the locking tab and the front edge of the top panel, wherein the first tab notch and the second tab notch are each configured to receive a portion of the front panel therein when the locking tab is in the closed configuration.

7. The box of claim 6, wherein the lock slot comprises a first slot end, a second slot end, and a center slot portion disposed therebetween, wherein the first slot portion and the second slot portion are angled with respect to the center slot portion.

8. The box of claim 1, wherein:

a first foldable front gusset is hingedly coupled between a first end of the front panel and a front end of the first side panel;

a second foldable front gusset is hingedly coupled between a second end of the front panel and a front end of the second side panel;

a first foldable rear gusset is hingedly coupled between a first end of the rear panel and a rear end of the first side panel; and a second foldable rear gusset is hingedly coupled between a second end of the rear panel and a rear end of the second side panel.

9. A box assembly comprising:

a box blank comprising a plurality of sidewall panels, a top panel arranged at a top end of the sidewall panels, and a bottom panel arranged at a bottom end of the sidewall panels; and a support assembly comprising a top edge defining a center opening, the support assembly being configured to slidably receive the bottom panel of the box blank therein, wherein the box blank is foldable from a blank configuration to an assembled box configuration, the top edge of the support assembly is configured to support the plurality of sidewall panels of the box blank thereon so the bottom panel is disposed inwardly of the top edge, the top edge of the support assembly is configured to fold the plurality of sidewall panels inwardly so that the box blank is folded from the box blank configuration to the assembled box configuration when the box blank is slidably received within the support assembly, the plurality of sidewall panels comprises a front panel, a rear panel opposite the front panel, a first side panel extending between the front and rear panels, and a second side panel opposite to the first side panel and extending between the front and rear panels;

the top panel comprises a locking tab hingedly coupled to a front edge of the top panel; and the front panel comprises a lock slot defined therein, the lock slot being configured to slidably receive the locking tab therein in a closed configuration.

10. The box assembly of claim 9, further comprising a handle cut formed in the top panel and defining a box handle, the box handle foldable relative to the top panel between a pre-erected configuration and an erected configuration, wherein, in the pre-erected configuration, the box handle is coplanar with the top panel, and, in the erected configuration, the box handle extends outwardly and away from the top panel.

11. The box assembly of claim 10, wherein the box handle comprises a first handle end, a second handle end, and a center portion extending therebetween, wherein the first handle end is connected to the top panel at a first fold line, and the second handle end is connected to the top panel at a second fold line.

12. The box assembly of claim 11, further comprising a finger cut formed in the top panel adjacent to the center portion of the top handle, wherein removal of the finger cut defines a finger opening in the top panel adjacent to the center portion of the top handle.

13. The box assembly of claim 9, wherein:

a first tab notch is defined between a first locking shoulder of the locking tab and the front edge of the top panel; and a second tab notch is defined between a second locking shoulder of the locking tab and the front edge of the top panel, wherein the first tab notch and the second tab notch are each configured to receive a portion of the front panel therein when the locking tab is in the closed configuration.

14. The box assembly of claim 13, wherein the lock slot comprises a first slot end, a second slot end, and a center slot portion disposed therebetween, wherein the first slot portion and the second slot portion are angled with respect to the center slot portion.

15. The box assembly of claim 9, wherein:

a first foldable front gusset is hingedly coupled between a first end of the front panel and a front end of the first side panel;

a second foldable front gusset is hingedly coupled between a second end of the front panel and a front end of the second side panel;

a first foldable rear gusset is hingedly coupled between a first end of the rear panel and a rear end of the first side panel; and a second foldable rear gusset is hingedly coupled between a second end of the rear panel and a rear end of the second side panel.

16. The box assembly of claim 9, wherein the support assembly further comprises an outer box comprising a plurality of sidewall panels, and a bottom panel arranged at a bottom end of the sidewall panels, wherein the top edge is defined by a top edge of each sidewall panel of the plurality of sidewall panels of the outer box.

* * * * *